US010452807B1

(12) United States Patent
Sharma et al.

(10) Patent No.: US 10,452,807 B1
(45) Date of Patent: Oct. 22, 2019

(54) METHOD, SYSTEM, AND COMPUTER PROGRAM PRODUCT FOR IMPLEMENTING ROUTING AWARE PLACEMENT FOR AN ELECTRONIC DESIGN

(71) Applicant: Cadence Design Systems, Inc., San Jose, CA (US)

(72) Inventors: Karun Sharma, Fremont, CA (US); Nikhil Garg, Haryana (IN); Juno Jui-Chuan Lin, Saratoga, CA (US); Subhashis Mandal, Noida (IN); Chandra Prakash Manglani, Noida (IN); Kanaka Raju Gorle, Nodia (IN); Henry Yu, Palo Alto, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 204 days.

(21) Appl. No.: 15/476,921

(22) Filed: Mar. 31, 2017

(51) Int. Cl.
*G06F 17/50* (2006.01)

(52) U.S. Cl.
CPC ........ *G06F 17/5081* (2013.01); *G06F 17/509* (2013.01); *G06F 17/5072* (2013.01); *G06F 17/5077* (2013.01); *G06F 2217/02* (2013.01); *G06F 2217/04* (2013.01); *G06F 2217/06* (2013.01)

(58) Field of Classification Search
CPC ............. G06F 17/5081; G06F 17/5072; G06F 17/5077; G06F 17/509; G06F 2217/06; G06F 2217/04; G06F 2217/02
See application file for complete search history.

(56) References Cited

U.S. PATENT DOCUMENTS

| | | | |
|---|---|---|---|
| 6,209,123 B1 | 3/2001 | Maziasz | |
| 6,370,673 B1 | 4/2002 | Hill | |
| 6,557,153 B1 | 4/2003 | Dahl | |
| 6,823,501 B1 | 11/2004 | Dahl | |
| 7,266,796 B1 | 9/2007 | Chu | |
| 7,937,682 B2 | 5/2011 | Arunachalam | |
| 8,448,117 B2 | 5/2013 | Dai | |
| 8,788,998 B2 * | 7/2014 | Hatamian | G06F 17/5072 716/119 |
| 9,465,908 B2 | 10/2016 | Bischoff | |
| 9,690,896 B2 * | 6/2017 | Seo | H01L 21/823871 |
| 9,727,685 B2 * | 8/2017 | Yuan | G06F 17/5081 |

(Continued)

OTHER PUBLICATIONS

Final Office Action dated May 17, 2018 for U.S. Appl. No. 15/396,156.
Non-Final Office Action dated Nov. 16, 2017 for U.S. Appl. No. 15/396,156.
Non-Final Office Action dated Feb. 8, 2018 for U.S. Appl. No. 15/396,205.

(Continued)

*Primary Examiner* — Nha T Nguyen
(74) *Attorney, Agent, or Firm* — Vista IP Law Group, LLP

(57) ABSTRACT

Disclosed are techniques for implementing routing aware placement for an electronic design. These techniques identify a block having one or more first pins or interconnects to be inserted into a first layer corresponding to a first set of tracks and identify a second set of tracks on a second layer adjacent to the first layer. One or more candidate locations may be generated on the first layer for the block based in part or in whole upon the first set of tracks. The block may be inserted into a candidate location on the first layer based in part or in whole upon respective costs or routability of the one or more candidate locations with respect to the second set of tracks.

20 Claims, 13 Drawing Sheets

(56) References Cited

U.S. PATENT DOCUMENTS

| | | |
|---|---|---|
| 2005/0198605 A1 | 9/2005 | Knol |
| 2007/0245281 A1 | 10/2007 | Riepe |
| 2007/0283306 A1 | 12/2007 | Koefferlein |
| 2009/0199142 A1 | 8/2009 | Arunachalam |
| 2009/0271753 A1 | 10/2009 | Quandt |
| 2009/0307640 A1 | 12/2009 | Chapman |
| 2010/0070942 A1 | 3/2010 | Madurawe |
| 2012/0241986 A1* | 9/2012 | Sherlekar ............ H01L 27/0207 257/784 |
| 2013/0042217 A1 | 2/2013 | Heng |
| 2013/0104093 A1 | 4/2013 | Huang |
| 2014/0289695 A1* | 9/2014 | Yoshida .............. G06F 17/5081 716/136 |
| 2014/0331198 A1 | 11/2014 | Bischoff |
| 2015/0067616 A1 | 3/2015 | Hsu |
| 2017/0032073 A1* | 2/2017 | Chen ................... G06F 17/5077 |
| 2018/0144082 A1 | 5/2018 | Hanchinal |

OTHER PUBLICATIONS

Non-Final Office Action dated Mar. 9, 2018 for U.S. Appl. No. 15/396,178.
Final Office Action dated Aug. 8, 2018 for U.S. Appl. No. 15/396,205.
Final Office Action dated Aug. 30, 2018 for U.S. Appl. No. 15/396,178.
Non-Final Office Action dated Oct. 4, 2018 for U.S. Appl. No. 15/396,156.
Non-Final Office Action dated Jan. 10, 2019 for U.S. Appl. No. 15/396,178.
Notice of Allowance dated Mar. 5, 2019 for U.S. Appl. No. 15/396,205.
Non-Final Office Action dated Mar. 12, 2019 for U.S. Appl. No. 15/396,229.
Non-Final Office Action dated Apr. 9, 2019 for U.S. Appl. No. 15/396,156.

* cited by examiner

METHOD, SYSTEM, AND COMPUTER PROGRAM PRODUCT FOR IMPLEMENTING ROUTING AWARE PLACEMENT FOR AN ELECTRONIC DESIGN

CROSS REFERENCE TO RELATED APPLICATIONS

This application is related to U.S. patent application Ser. No. 15/396,156, entitled "METHOD, SYSTEM, AND COMPUTER PROGRAM PRODUCT FOR IMPLEMENTING GROUP LEGAL PLACEMENT ON ROWS AND GRIDS FOR AN ELECTRONIC DESIGN" filed on Dec. 30, 2016, U.S. patent application Ser. No. 15/396,178, entitled "METHOD, SYSTEM, AND COMPUTER PROGRAM PRODUCT FOR IMPLEMENTING GROUP LEGAL PLACEMENT ON ROWS AND GRIDS FOR AN ELECTRONIC DESIGN" filed on Dec. 30, 2016, U.S. patent application Ser. No. 15/396,229, entitled "METHOD, SYSTEM, AND COMPUTER PROGRAM PRODUCT TO IMPLEMENT SNAPPING FOR AN ELECTRONIC DESIGN" filed on Dec. 30, 2106, U.S. patent application Ser. No. 15/396,205, entitled "METHOD, SYSTEM, AND COMPUTER PROGRAM PRODUCT FOR IMPLEMENTING LEGAL PLACEMENT WITH CONTEXTUAL AWARENESS FOR AN ELECTRONIC DESIGN" filed on Dec. 30, 2016. The content of the aforementioned U.S. patent applications are hereby incorporated by reference in their respective entireties for all purposes.

BACKGROUND

Physical implementation flow of a modern electronic design often starts with the floorplanning and placement stage at which various instances, blocks, cells, etc. are inserted in a layout canvas of the electronic design according to various criteria or rules governing the floorplan or the placement layout. This placement layout may then be forwarded to a router to perform, for example, global and detailed routing to complete the physical design. Conventional floorplanners or placement engines are merely concerned with the floorplanning or placement rules and constraints but are not aware of the routing or routability requirements, rules, or constraints or do not have sufficient knowledge therefor and thus may cause various issues or errors during the subsequent routing stage. Some errors may even require a portion of a layout be ripped up and rerouted.

For example, when inserting a block, a cell (e.g., an intellectual property or IP cell, a parameterized or non-parameterized cell, a custom cell, etc.), or a macro (collectively block hereinafter) into a layer of a floorplan or a placement layout, conventional floorplanner or placement tools merely consider the design rules, constraints, and/or requirements pertaining to the layer into which the block is to be inserted yet often fail to account for design rules, constraints, and/or requirements pertaining to neighboring layers. With the advanced technology nodes that permit only one routing direction for each layer, these conventional approaches often cause routability issues.

As a result, routing a modern electronic designs or routability of an electronic design may be severely affected by the placement of devices in the electronic design. For example, if a device is placed in a layout so that a pin in the device does not cover enough area of a routing track, a via may not be inserted to interconnect the pin with another pin on another layer of the electronic design.

Conventional approaches resolve these routability issues by using double vias. Double vias or redundant vias are often used to improve yield and reliability of electronic designs because when one of the double or redundant vias fails, the other via may nevertheless serve to maintain the functionality of the chip. In the aforementioned example of a pin not covering sufficient area for via insertion, the use of double or redundant vias may lose its advantages in enhancing reliability and yield because both vias are needed due to the pin's insufficient coverage of a routing track.

In addition to the additional costs in the implementation and the use of the invaluable real estate on silicon, double or redundant vias have been shown not to exhibit any advantages in terms of, for example, EM reliability. Also, double or redundant vias may cause the capacitance to increase, especially in deep sub-micron technology nodes, and may pose additional challenges in a timing analysis because the RC time constant is nearly doubled for a redundant via, especially for short connections.

Routability such as the aforementioned pin access has become one of the most difficult challenges for routing in advanced technology nodes (e.g., 14 nm and below) for which double-patterning lithography has to be used for manufacturing lower metal routing layers with tight pitches, such as M2 (metal two layer) and M3 (metal three layer). Some conventional approaches employ self-aligned double patterning (SADP) techniques that provide better control on line edge roughness and overlay, but the SADP techniques also impose highly restrictive design constraints as well as regular and structured layout patterns that greatly limit the flexibility in design options and hence the overall costs of the implementation of IC (integrated circuit) designs will increase.

Moreover, modern electronic design involving advanced technology nodes often require wires and interconnects be implemented within rows or on routing tracks or even on routing tracks of legal track patterns governed by the semiconductor fabrication foundries. In these modern electronic designs, vias cannot be added to route into or out of a pin when the pin is not placed at a location to cover a sufficient area of a routing track. It shall be noted that a routing track is merely an imaginary line or line segment derived from, for example, the manufacturing grids provided by semiconductor fabrication foundries. Therefore, a routing track has no width yet may be associated with a width value so that a wire may assume or inherit the associated width value when implemented along this routing track.

Therefore, there is a need for implementing routing aware placement for an electronic design to address at least the aforementioned shortfalls of conventional approaches.

SUMMARY

Disclosed are method(s), system(s), and article(s) of manufacture for implementing routing aware placement for an electronic design in various embodiments.

Some embodiments are directed to a method for implementing routing aware placement for an electronic design. In these embodiments, a block having one or more first pins or interconnects to be inserted into a first layer corresponding to a first set of tracks of a floorplan or a placement layout of an electronic design may be identified. A second set of tracks on a second layer adjacent to the first layer may also be identified. One or more candidate locations may be generated on the first layer for the block based in part or in whole upon the first set of tracks. The block may be inserted into a candidate location on the first layer based in part or in whole upon respective costs or routability of the one or more candidate locations with respect to the second set of tracks.

In some of these embodiments, the one or more candidate locations are generated at least by filtering a plurality of candidate locations based in part or in whole upon the first set of routing tracks associated with the first layer. A current location of the block on the first layer in a floorplan or a placement layout of the electronic design may be optionally identified. In addition or in the alternative, one or more neighboring layers including the second layer of the electronic design may be identified; the second set of routing tracks along a second routing direction that is different from a first routing direction in which the first set of routing tracks is oriented may also be identified; and the one or more first pins or interconnects on a first layer may also be identified for the block and one or more requirements of the first set of routing tracks in the first routing direction.

In some of these embodiments, the respective costs or routability may be determined for the one or more candidate locations based in part or in whole upon one or more characteristics of the second set of routing tracks; and a final candidate location may also be determined or selected from the one or more candidate locations based in part or in whole upon the respective costs or routability. Furthermore, a plurality of blocks including the block, the one or more first pins or interconnects on first layer, and one or more characteristics for the block may be identified; and the plurality of blocks may be categorized into a plurality of complexity classes in some of these embodiments.

In some embodiments, the one or more characteristics include at least one of a geometric characteristic of a pin or interconnect, a position of the pin or interconnect in the block, a relative location of the pin or interconnect to another pin or interconnect, a total number of pins or interconnects in the block, a density of the one or more first pins or interconnects in the block, a number of internal wires or interconnects connecting at least some of the one or more first pins or interconnects, one or more types of the internal wires or interconnects connecting the at least some of the one or more first pins or interconnects, one or more sizes of the internal wires or interconnects connecting the at least some of the one or more first pins or interconnects, an estimated number of external wires or interconnects that are to connect at least one of the one or more first pins to at least one different pin or interconnect of a different block, one or more types of external wires or interconnects that are to connect at least one of the one or more first pins to at least one different pin or interconnect of a different block, an estimated number of jogs or vias for the external wires or interconnects, one or more spacing requirements between the block and one or more other blocks, one or more track pattern requirements of the first set or the second set of routing tracks, or one or more combinations thereof.

In addition or in the alternative, the plurality of complexity classes may be associated with the respective routing costs or routability. In some of these embodiments, one or more neighboring blocks that are adjacent to the block, the one or more first pins or interconnects of the block and one or more second pins or interconnects of the one or more neighboring blocks, respective complexity classes of the block and the one or more neighboring blocks, and corresponding routing costs or routability of the block and the one or more neighboring blocks may be identified. In some embodiments, a number of routing tracks may be determined in a region between the block and at least one neighboring block of the one or more neighboring blocks.

Optionally, one or more edge types of opposing edges or edge segments of the block and the one or more neighboring blocks may be identified; the opposing edges or edge segments may be annotated with information stored in a edge characteristic data structure; or the floorplanning module or the placement module may be guided with at least some of the information stored in the edge characteristic data structure in some embodiments. In some of these embodiments, the one or more candidate locations may be determined for each block of the plurality of blocks based in part or in whole upon the number of routing tracks or the information stored in the edge characteristic data structure.

Some embodiments are directed at a hardware system that may be invoked to perform any of the methods, processes, or sub-processes disclosed herein. The hardware system may include at least one processor or at least one processor core, which is programmed to execute one or more threads of execution to perform any of the methods, processes, or sub-processes disclosed herein in some embodiments. The hardware system may further include one or more forms of non-transitory machine-readable storage media or devices to temporarily or persistently store various types of data or information. Some exemplary modules or components of the hardware system may be found in the System Architecture Overview section below.

Some embodiments are directed at an article of manufacture that includes a non-transitory machine-accessible storage medium having stored thereupon a sequence of instructions which, when executed by at least one processor or at least one processor core, causes the at least one processor or the at least one processor core to perform any of the methods, processes, or sub-processes disclosed herein. Some exemplary forms of the non-transitory machine-readable storage media may also be found in the System Architecture Overview section below.

More details of various aspects of the methods, systems, or articles of manufacture for implementing placement using row templates for an electronic design using row templates are described below with reference to FIGS. 1-7B.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
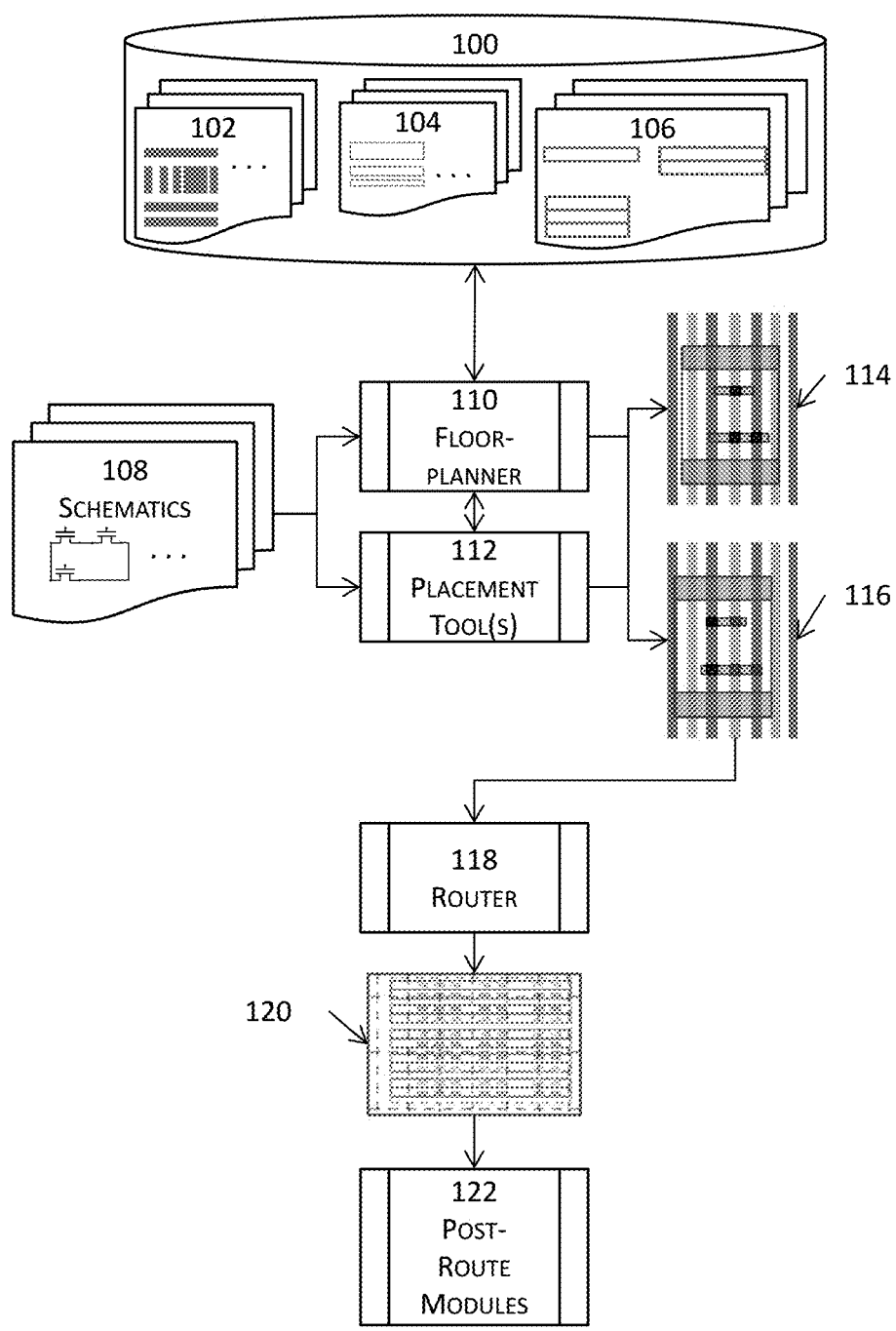
FIG. 1 illustrates a high level block diagram for implementing routing aware placement for an electronic design in one or more embodiments.

Various embodiments are directed to a method, system, and computer program product for implementing placement using row templates for an electronic design using row templates. Other objects, features, and advantages of the invention are described in the detailed description, figures, and claims.

To address at least the aforementioned issues, some embodiments described herein are directed to routing aware placement techniques where circuit components are placed in a layout to increase, maximize, and/or optimize pin access points or possible via locations during interactive, assisted, and/or automatic placement for an integrated circuit design. Placement or floorplanning of blocks or cells determines the locations of pins and thus may affect routing results, especially when a pin is not placed along a track associated with sufficient width. More specifically, the routing aware placer involves the improvement/optimization/maximization of pin access points or possible via locations during placement of blocks and cells by calculating, on the fly or in a batch mode, the overall cost of accessing each block or cell based on the access points for each pin.

Various costs such as estimated wire lengths, the number of bends, congestion, metal density, the total number of tracks involved, the number of pin access points, the number of potential violations, etc. may be used in the cost estimation for the optimization flows. In some embodiments where routing is permitted in only one routing direction for a given layer, a pin access point includes a projected intersection of a pin in a first direction on a layer in a layout and a routing track or a routed interconnect in a second direction on an immediately adjacent layer in the layout. In these embodiments, no bends are allowed to route interconnects or wires, and when a bend is needed to finish an interconnect or wire, a via may be inserted to bring the interconnect or wire to an adjacent layer that permits routing in a different routing direction. Various techniques described herein thus improve an area of the projected intersection and/or the number of projected intersections between a pin design on one layer and a routing track or an interconnect on the immediately adjacent layer.

Some embodiments further provide not only legal placement positions but also ranked legal positions for a block or cell during interactive or assisted placement for an integrated circuit design. For example, when a user selects an instance for placement in a layout, these techniques may not only compute, for example, the closest or the next legal position to place the instance depending on where the user drags the instance in the placement layout but also show graphically and/or textually any violations of one or more options, requirements, constraints, or design rules. An example of such violations includes textually and/or graphically showing one or more pins having their respective numbers of access points that are less than a threshold number of access points. During optimization, the total number of projected intersections may not necessarily increase.

For example, the routing aware placement engine described herein may determine two legal positions for an instance having two pins. At the first legal position, the first pin may have three pin access points, and the second pin may have one pin access point. At the second legal position, the first pin may have two pin access points, and the second pin may also have two pin access point. The routing aware placement engine may determine that the second legal position is a more optimized position although the first legal position has one fewer pin access point because the second pin also has two pin access points and thus provides more flexibility during subsequent routing for the second pin.

It shall be noted that the aforementioned example is simplified in the sense that the routing aware placer only considers one instance having two pins and evaluates the legal placement options solely based on the number of pin access points. In other examples, the routing aware placer considers multiple instances in the entire layout or a portion thereof based a set of criteria including, for example, estimated wire lengths, the number of bends, congestion, metal density, the total number of tracks involved, the number of pin access points, the number of potential violations, timing performance or constraints, or any combinations thereof despite the fact that no routing information is available during the placement stage. In estimating the wire lengths, metal densities, the number of bends, timing, and congestion in the absence of routing information, the routing aware placement engine may use straight line segments (e.g., flight-lines) to connect corresponding connection points according to the schematic or straight line segments having one or more bends in a Manhattan grid to connect corresponding connection points according to the schematic.

In some embodiments, a user may specify a threshold number of pin access points for one or more pins. As a simplified example, a user may specify that the threshold number of pin access points for all pins in a layout or a portion thereof is not to be less than three. In this example, the routing aware placement engine may evaluate one or more legal placement positions and, for each evaluated legal placement position, graphically and/or textually show the pins that fail to meet this specified threshold of pin access points. In some embodiments, this graphical and/or textual feedback is provided in a nearly real-time manner due to the expediency and efficiency of the routing aware placement engine that employs a lookup table listing legal track patterns that respectively include permissible combinations or arrangements of routing tracks and their corresponding width values. It shall be noted that the threshold number of pin access points may be treated as a hard constraint that must be complied with in some embodiments or a soft constraint that is desired to be satisfied in some other embodiments.

These techniques for improving pin access during placement of an integrated circuit design apply with full and equal effects to various placement tools such as the row-based or row template-based placement tools described above. With the row-based or row template-based placement tools, the specifications for the rows or the row templates impose more information (e.g., alignment information with respect to various grids including the poly grids, the fin grids, etc., offset information, permissible types of devices, etc.) that may be further leveraged by the routing aware placement tool to pre-filter placement options to reduce the search space in which the routing aware placement tool needs to search to identify legal placement positions.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

FIG. 1 illustrates a high level block diagram for implementing routing aware placement for an electronic design in one or more embodiments. In these embodiments, a plurality of EDA (electronic design automation) resources including, for example, libraries 102, legal track patterns 104, row templates 106, etc. may be stored within a data structure 100. Upon receiving a request to create a floorplan, a placement layout, or a portion thereof of an electronic design from, for example, the user interface, a floorplanner 110 or a placement tool 112 may reference these EDA resources 100 and identify the corresponding schematics 108 of the electronic design. The floorplanner 110 and the placement tool 112 may be further operatively coupled to one or more schematic tools (e.g., a schematic editor, etc.) that may be used to manipulate the corresponding schematics 108.

The floorplanner 110 or the placement tool 112 may identify a region or place and route boundary, identify one or more row templates or one or more track patterns from the data structure 100, and apply the one or more row templates or the one or more track patterns to the region to create, for example, one or more rows in the row region as well as one or more track patterns and to associated respective configurations, characteristics, and/or attributes with these one or more rows and one or more track patterns. The floorplanner 110 or the placement tool 112 may then employ the techniques described herein to generate a floorplan, a placement layout, or a portion thereof (e.g., 114, 116, etc.)

Depending on whether the floorplanning or placement is performed in an interactive, assisted, or automatic manner, the floorplanner 110 or the placement tool 112 may then issue floorplanning or placement commands to query the rows to obtain the row attributes, characteristics, or configurations that are further used to determine the rows into which one or more instances may be legally inserted; and the floorplanner 110 or the placement tool 112 may also determine the locations at which the one or more instances may be legally inserted. These one or more instances may then be inserted into their respective rows at their respective locations as guided by the row template and the legal track pattern(s) to generate the placement layout or floorplan 114 or 116.

The floorplan or placement layout (114 or 116) may be further forwarded to a routing engine 118 that interconnects the device and circuit component designs in the layout 120. The layout 120 may be further processed with various post-route modules 122 to generate a fabrication worthy layout from which a set of mask designs can also be generated to ready the electronic design for tapeout.

Figure 2A:
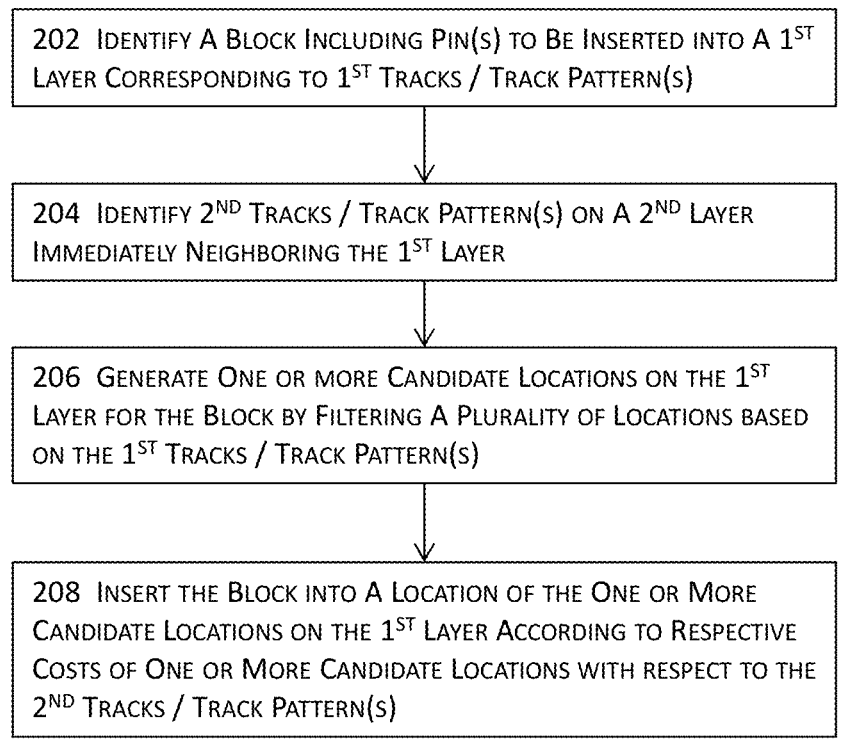
FIG. 2A illustrates a high level flow diagram for implementing routing aware placement for an electronic design in one or more embodiments.

FIG. 2A illustrates a high level flow diagram for implementing routing aware placement for an electronic design in one or more embodiments. In these embodiments, a block, a cell, or a macro (collectively block for singular or blocks for plural) that includes one or more pins and is to be inserted into a first layer may be identified at 202. The first layer corresponds to a first set of routing tracks in a first routing direction, and the first set of routing tracks may include a collection of routing tracks in some embodiments or one or more track patterns in some other embodiments. In some embodiments, only one routing direction is permitted for a layer. In these embodiments, no bends or jogs of interconnects or wires are permitted. Instead, when a wire changes its orientation (e.g., from horizontal routing direction to the vertical routing direction), the wire jumps to an immediately neighboring layer using one or more vias to connect the first layer and the immediately neighboring layer.

A routing track or simply a track is an imaginary line or line segment that is often derived from the manufacturing grids provided by semiconductor fabrication facilities. A track thus has no thickness and is often used by track-based floorplanners, placement engines, and routers to implement the physical designs of an electronic design. A track pattern is a specific, permissible arrangement of routing tracks each of which is associated with a specific width value.

For example, modern electronic fabrication of a technology node may allow only the width values of {32 nm, 34 nm, 38 nm, 46 nm, 58 nm, 62 nm, 70 nm, 76 nm, 78 nm, 86 nm} in electronic designs. Modern electronic design fabrication does not provide the freedom of having wires with arbitrary widths. More critically, modern electronic design fabrication does not allow wires having arbitrary widths immediately adjacent to one another. Rather, a wire of a certain width value can only be situated right next to a smaller set of width values. In the aforementioned example, a wire having a 32 nm width may only be situated to wires having width of 32 nm, 34 nm, 38 nm, 46 nm, and 58 nm but not wires having 62 nm or wider width values.

A second set of routing tracks in a second routing direction may be identified at 204 for a second layer that immediately neighbors the first layer. Similar to the first set of routing tracks in the first routing direction, the second set of routing tracks may include a collection of routing tracks not pertaining to any track patterns in some embodiments or one or more second track patterns in some other embodiments. For example, a first set of horizontal routing tracks may be identified at 202 for the inserting of a block into a first layer (e.g., M2 or metal 2 layer); and a second set of vertical routing tracks may be identified at 204 for the immediately neighboring layer (e.g., M3 layer).

One or more candidate locations for the block may be generated at 206. These one or more candidate locations may be generated at 206 at least by filtering a plurality of locations based in part or in whole upon the first set of tracks or one or more first track patterns. For example, a block including multiple pins may be inserted into a floorplan or a placement layout. Because these multiple pins with fixed relative positions are going to be implemented along some of the first set of tracks or the one or more first track patterns, a plurality of locations in the floorplan or placement layout may thus be filtered by using the first set of track or the one or more first track patterns to eliminate or discard one or more locations that do not correspond to correct routing tracks or track pattern(s).

By eliminating or discarding one or more locations, the techniques generating the one or more candidate locations no longer need to load the one or more discarded locations into memory and to analyze the floorplan or placement layout at these one or more discarded locations with expensive processor cycles. Therefore, computational resources such as memory footprint, processor cycles, and/or network resources are conserved.

The block may then be inserted at 208 into a location of the one or more candidate locations on the first layer based in part or in whole upon the respective costs associated with these one or more candidate locations with respect to the second set of tracks or one or more second track patterns. In some embodiments, the location corresponding to the lowest cost among the one or more candidate locations may be selected as the location for insertion of the block onto the first layer. More details about the costs as well as the selection of the location for insertion of the block will be described below with reference to FIGS. 3A-3C.

Figure 2B:
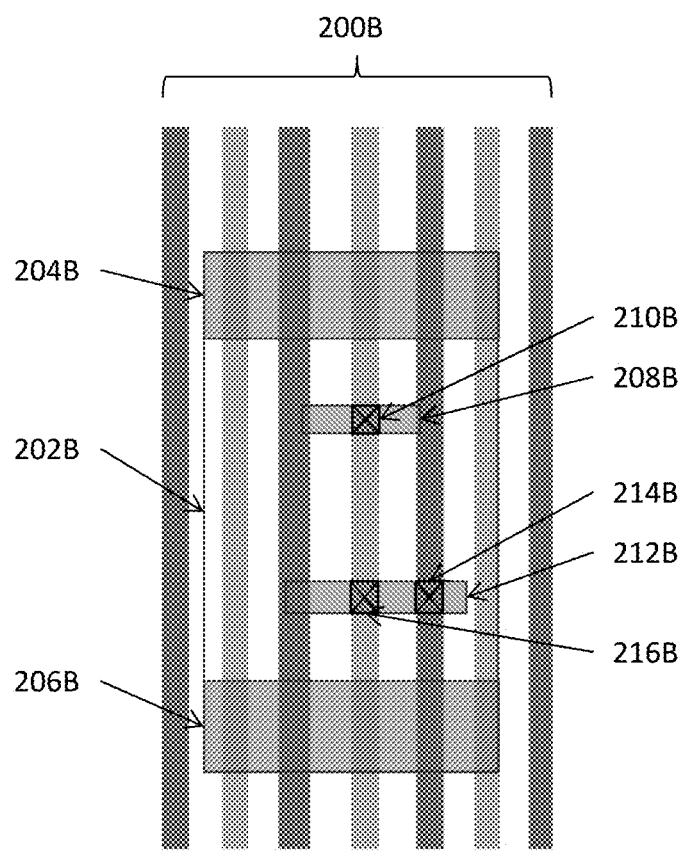
FIGS. 2B-2C illustrate some examples of operations of the high level flow diagram on a simplified portion of an example electronic design in some embodiments.
Figure 2C:
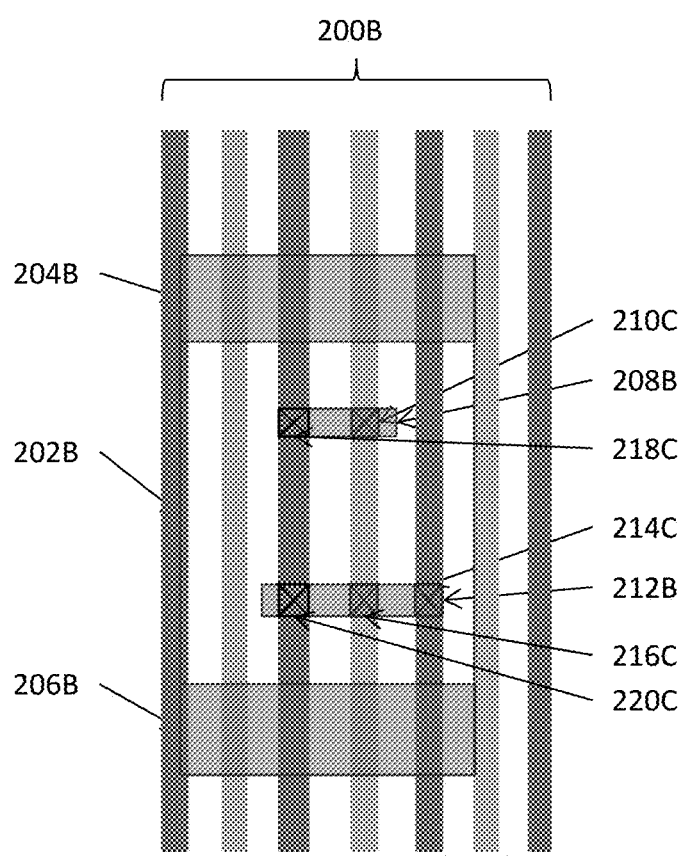

FIGS. 2B-2C illustrate some examples of operations of the high level flow diagram on a simplified portion of an example electronic design in some embodiments. In these examples, a block 202B includes VCC (204B), VSS (206B), and two horizontal pins or interconnects 208B and 212B and is inserted into a portion on a first layer of a layout. These two horizontal pins are to be implemented along two horizontal routing tracks (not shown) for the first layer so that the centerlines of these two horizontal pins or interconnects are aligned with their corresponding horizontal routing tracks.

Some techniques described herein identify a second set of routing tracks or one or more second track patterns 200B that are oriented in a different routing direction as described at 204 of FIG. 2. In this example, the first layer corresponds to the horizontal routing direction and hence horizontal routing tracks; and the second layer corresponds to the vertical routing direction and hence vertical routing tracks 200B.

As it can be seen from FIG. 2B, the pin or interconnect 208B covers only one routing track of the second set of routing tracks or one or more second track patterns 200B. Therefore, this implementation of the block 202B provides only one possible via location 210B for the pin or interconnect 208B. Furthermore, the pin or interconnect 212B covers two routing tracks of the second set of routing tracks or one or more second track patterns 200B.

As a result, this implementation of the block 202B provides two possible via locations (or two possible pin access points) 214B and 216B for the pin or interconnect 212B. It shall be noted that although the second set of routing tracks or one or more second track patterns 200B appear to include routing tracks having some width values, these width values are associated with the routing tracks for illustration purposes, and these routing tracks are nevertheless line segments having the zero width value.

FIG. 2C illustrates an example of the application of some techniques described herein to determine an improved or optimal location for the insertion of the block 202B. In this example, the floorplanner or the placement engine moves the block 202B toward the left to a location where the pin or interconnect 208B covers the second set of tracks or the one or more second track patterns 200B in two instances 210C and 218C; and the pin or interconnect 212B covers the second set of tracks or the one or more second track patterns 200B in three instances 214C, 216C, and 220C. As a result, this implementation illustrated in FIG. 2C provides two and three possible via locations for pins or interconnects 208B and 212B, respectively.

When compared to the implementation illustrated in FIG. 2B, the implementation illustrated in FIG. 2C provides more flexibility, and the associated cost of subsequent routing this implementation of the electronic design are thus lower than that of routing the implementation illustrated in FIG. 2B. This implementation in FIG. 2C thus constitutes an improved version of the implementation illustrated in FIG. 2B. It shall be noted that this simplified example correlates costs with the number of pin access points.

Nonetheless, costs (e.g., subsequent routing or implementation cost) may be determined in various other manners that will be described in greater details below with reference to FIGS. 3A-3C. Moreover, FIGS. 2B-2C illustrate an example of selecting a location from two candidate locations for inserting the block into the first layer of the floorplan or placement layout based on the numbers of pin access points. In this example, these techniques evaluate the numbers of pin access points or possible locations for via insertion and select the candidate location illustrated in FIG. 2C over the candidate location illustrated in FIG. 2B.

Figure 3A:
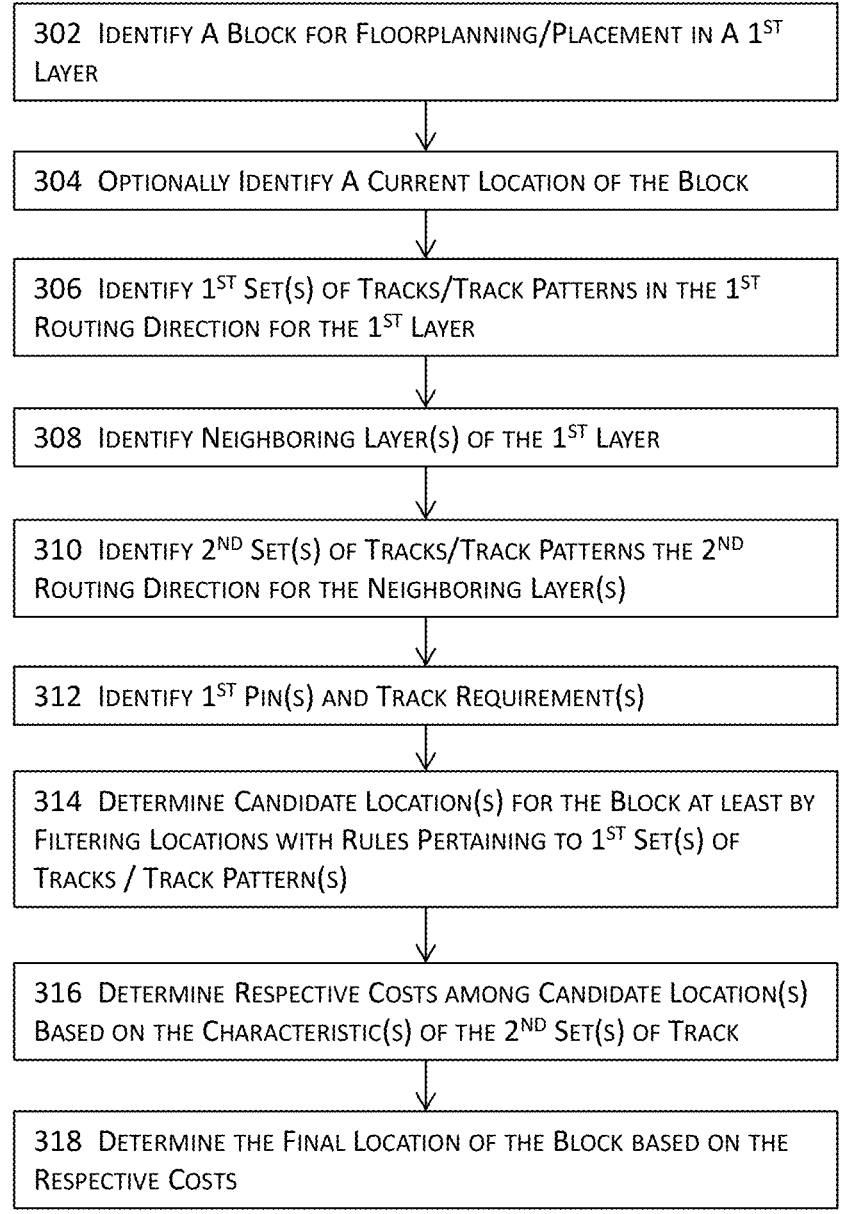
FIG. 3A illustrates a more detailed flow diagram for implementing routing aware placement for an electronic design in some embodiments.

FIG. 3A illustrates a more detailed flow diagram for implementing routing aware placement for an electronic design in some embodiments. In these embodiments, a block for floorplanning or placement in a first layer of an electronic design may be identified at 302. Depending on the mode of floorplanning or placement, a current location of the block may be optionally identified at 304. For example, a designer may use a pointing device to click on and drag the block around in the floorplan or placement layout in an interactive floorplanning or placement mode. These techniques may sample the location of the cursor of the point device at one or more predetermined sampling rates based on the speed at which the cursor moves to determine the current location of the block.

In some embodiments where the current location is identified at 304, this current location may or may not be a legal location to insert the block. In some of these embodiments, one or more legal locations (e.g., one or more closest legal locations) may be identified for the identified current location; and these one or more legal locations may be graphically illustrated in the user interface to provide where the block may be legally inserted based on the current location of the block. The design may move the block to the vicinity of one legal location (e.g., moving the block to an extent where the block is closest to one legal location and farther away from the other legal locations), and these techniques may automatically snap the block to the legal location to result in a legal solution.

A first set of tracks or one or more first track patterns in the first routing direction may be identified at 306 for the first layer. One or more neighboring layers of the first layer may be identified at 308; and a second set of tracks or one or more second track patterns in the second routing direction may be identified at 310.

In some embodiments, a layer may be associated with only one routing direction. In these embodiments, no bends are allowed to route interconnects or wires on this layer, and when a change in the routing direction is needed to finish an interconnect or wire, a via may be inserted to bring the interconnect or wire to an immediately adjacent layer that permits routing in a different routing direction. In some other embodiments, a layer may be associated with two routing directions. In these latter embodiments, the first set of tracks or the one or more first track patterns identified at 306 include routing tracks in the first routing direction; and the second set of tracks or the one or more second track patterns identified at 310 include routing tracks in the second routing direction that is different from the first routing direction.

One or more pins or interconnects in the block may be identified at 312. In some of these embodiments, one or more additional characteristics or requirements such as characteristics or requirements pertaining to one or more rows, one or more track patterns, etc. pertaining to the one or more pins or interconnects or pertaining to the block may also be identified at 312.

These one or more pins or interconnects in the block identified at 312 include only the pins along the second routing direction but not the pins or interconnects along the first routing direction in some embodiments. These pins or interconnects along the first routing direction on the first layer can be placed along their respective routing tracks in the first routing direction based in part or in whole upon rules or constraints including the track pattern rules or constraints that require pins, interconnects, etc. to be implemented along a legal set of routing tracks.

One or more candidate locations for the block may be determined at 314 at least by filtering a plurality of locations with one or more rules, constraints, or requirements pertaining to the first set of routing tracks or one or more first track patterns. For example, a floorplan, a placement layout, or a portion thereof may provide a plurality of locations to accommodate the block. Nonetheless, not all of the plurality of locations produces legal solutions because design rules, constraints, or requirements pertaining to, for example, row-based layout, track patterns, etc. may cause one or more of the plurality of locations to produce an illegal solution when the block is inserted at these one or more locations.

For example, a row may be associated with certain attributes (e.g., permissible device type(s), offset(s), heights, device alignment requirements, etc.) that are incompatible with the block no matter how the block is oriented in the floorplan or placement layout. As another example, the block may include certain pins or interconnects that require a particular arrangement of routing tracks for implementation, yet this particular arrangement routing tracks of the block may be incompatible with those in certain portions in the floorplan or placement layout.

In addition to the rules, constraints, or requirements pertaining to the first set of tracks, these one or more candidate locations may also be determined by further filtering the plurality of locations with the rules, constraints, or requirements pertaining to the second set of tracks or one or more second track patterns. In these embodiments, these techniques may first filter a plurality of locations with the rules, constraints, or requirements pertaining to the first set of routing tracks to reduce the plurality of locations to a reduced set of locations as described immediately above. For example, any locations in the plurality of locations that fail to provide the arrangements of routing tracks for the pins or interconnects in the first routing direction or fail to provide the rows associated with compatible attributes may be discarded, ignored, or eliminated from the plurality of locations.

These techniques may perform a second stage filtering on the reduced set of locations with another set of rules, constraints, or requirements pertaining to the second set of routing tracks or one or more second track patterns. For example, any locations in the reduced set of locations that fail to provide the arrangements of routing tracks for the pins or interconnects in the second routing direction or fail to provide the rows associated with compatible attributes may be further discarded, ignored, or eliminated from the reduced set of locations. In these aforementioned embodiments, one or more of these design rules, constraints, or requirements may be used to filter out one or more illegal positions such that subsequent processing no longer need to consider as many possible locations to insert the block.

By eliminating or discarding such one or more illegal locations, these one or more candidate locations may be determined at 314. Moreover, the placement engine or floorplanner no longer needs to load the one or more discarded locations into memory and to analyze the resulting floorplan or placement layout at these one or more illegal locations with expensive processor cycles. As a result, computational resources such as memory footprint, processor cycles, and/or network resources are conserved.

In addition or in the alternative, these one or more candidate locations may be further limited by imposing a configurable search boundary (e.g., a halo with a predetermined range around the current or intended location of the block in the floorplan or the placement layout) to confine the search space for the floorplanner or the placement engine. By limiting the search space, computational resources (e.g., processor cycles, memory footprint, and/or network resources) may be conserved.

In some embodiments, these computational resource conservation techniques may be balanced against the computational power of the computing systems that implement routing aware placement or floorplanning as well as the mode of operation of the placement or floorplanning. For example, heavier computational resource reduction techniques may be employed for less powerful computing systems and/or for modes of operations that require faster or nearly instantaneous response time (e.g., interactive mode of placement or floorplanning) in some embodiments.

On the other hand, lighter or even no computation resource reduction techniques may be needed for power computing systems and/or for modes of operations that do not require faster or nearly instantaneous response time (e.g., automatic placement or floorplanning, assisted placement, etc.) in other embodiments. In some other embodiments, at least some computational resource reduction techniques may be employed regardless of the computing systems used or modes of operations adopted.

With the one or more candidate locations determined, respective costs for these one or more candidate locations may be determined for the block at 316. The block may include one pin or interconnect under consideration in some embodiments or more than one pin or interconnect in other embodiments. Regardless of whether the block includes one or more pins or interconnects, these respective costs may be determined with respect to one pin or interconnect of the block in some embodiments. For example, these respective costs may be determined with respect to a more critical pin or interconnect in the block in these embodiments. In some other embodiments, these respective costs may be determined with respect to a plurality of pins or interconnects or even all of the pins or interconnects in the routing direction of interest.

Similarly, these respective costs may be determined with respect to one routing direction or both routing directions. In some embodiments where these respective costs may be determined with respect to both routing directions, these respective costs may be determined at 316 based in part or in whole upon one or more characteristics of the second set of routing tracks or the one or more second track patterns identified at 310. For example, these one or more characteristics may include the number of routing tracks covered by an area on the first layer associated with the first set of routing tracks or one or more first track patterns.

In some embodiments where two implementation options correspond to the same number of routing tracks in the second direction, these two implementation options may be distinguished based on which implementation option includes the routing tracks that provide more implementation options to the wires or interconnects when implemented along these second set of routing tracks. For example, a second routing track associated with a larger width value may provide more implementation options than another second routing track associated with a smaller width value because a thinner wire may be implemented along routing track associated with a larger width value, but not vice versa. As a result, two sets of routing tracks may nevertheless provide different flexibility during design implementation; and the set providing higher flexibility may be selected over the other set providing lower flexibility in some embodiments.

Similar to the limit imposed upon the search for candidate locations, a threshold limit may also be imposed upon the search and computation of these respective costs; and such a threshold limit may also be balanced against similar criteria including, for example, how powerful the computing systems are, the modes of operations, etc.

These respective costs estimate or predict the routability or the subsequent routing costs of the floorplan or the placement layout when the block is placed at each of these one or more candidate locations. An earlier example includes the number of pin access points or possible via locations as a cost measure. Nonetheless, these costs may include various other measures including, for example, estimated wire or interconnect lengths based on the connectivity, the number of bends or jogs to furnish the interconnections, local or regional congestion in one region versus another region, metal density in at least a portion of the electronic design, the number of routing tracks available for implementing wires or interconnects in at least a portion of the electronic design, the number of possible or actual violations of design rules or design requirements (e.g., electromigration requirements, electromagnetic interference requirements, timing requirements, etc.), whether the estimated or predicted routing results in a structured implementation or how structured the estimated or predicted routing result is, and/or the number of pin access points or possible via locations in some embodiments.

In some embodiments, multiple cost measures may be considered and assigned respective weights based in part or in whole upon the intended purpose of the electronic design or a portion under consideration. For example, a higher weight may be assigned to the timing requirement or the electromagnetic interference requirement for a performance oriented electronic design or a portion thereof that is clocked to a higher clock frequency.

These cost measures may also be adaptive and subject to adjustments based in part or in whole one or more neighboring blocks or the presence thereof. For example, during the early phase of floorplanning or placement, a more relaxed cost measure may be employed to place the first number block(s) because measures such as routing congestion, metal densities, etc. are of less concern during the early phase. More stringent cost measures may be employed as the floorplanning or placement proceeds to the later stages due to the higher complexities of the floorplan or placement layout and hence more interactions among various blocks in the floorplan or placement layout.

The final location for inserting the block into the floorplan or the placement layout may be determined at 318 based in part or in whole upon the respective costs associated with the one or more candidate locations. More details about the block 318 will be described below with reference to FIGS. 3B-3C.

Figure 3B:
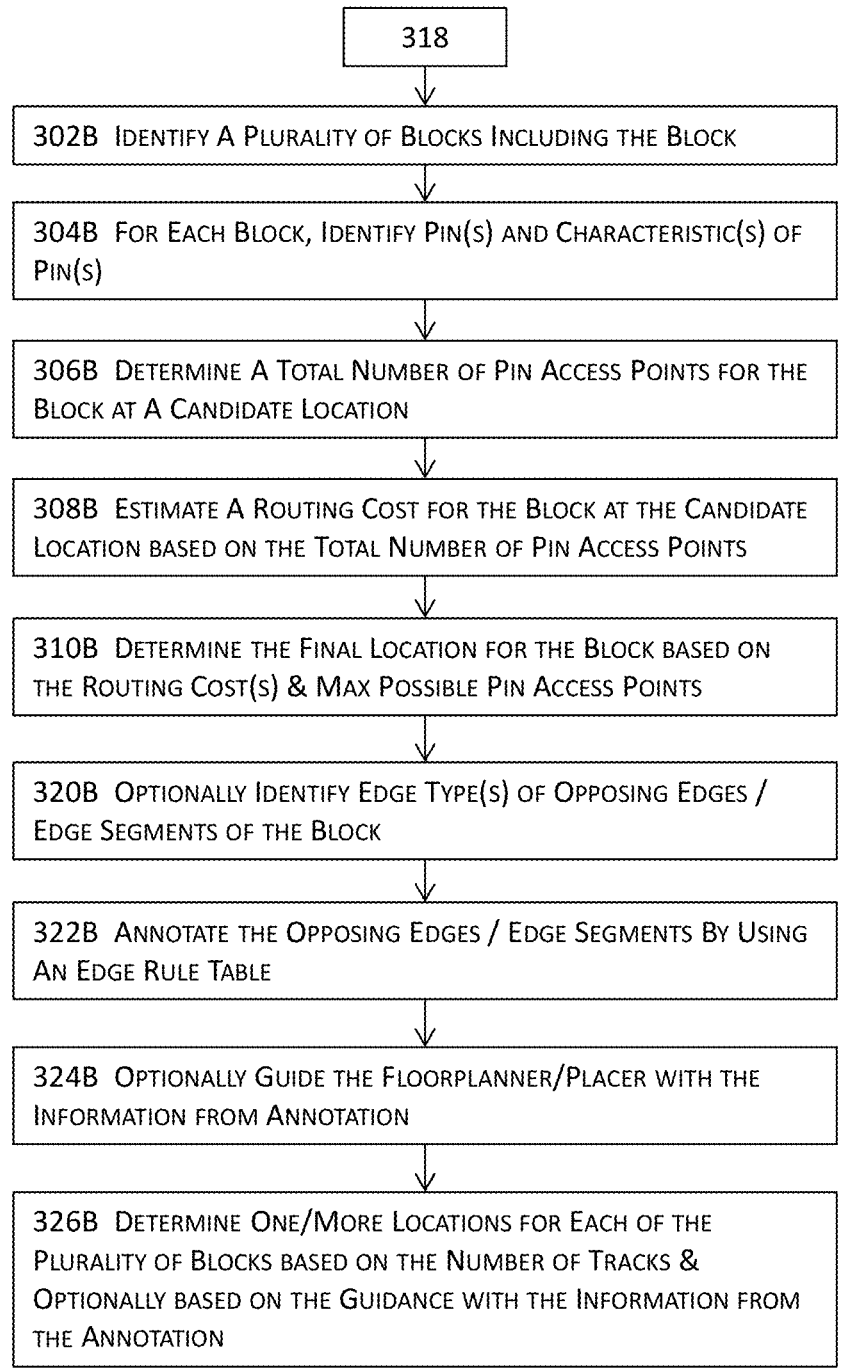
FIG. 3B illustrates more details of a block in the flow diagram illustrated in FIG. 3A in some embodiments.

FIGS. 3B-3C jointly illustrate more details of a block in the flow diagram illustrated in FIG. 3A in some embodiments. In these embodiments, a plurality of blocks is identified at 302B to be inserted into a floorplan or a placement layout. Each of the plurality of block may include one or more pins or interconnects and one or more characteristics. These one or more pins or interconnects and one or more characteristics may be identified at 304B.

These one or more pins or interconnects may be in a first routing direction (preferred or permissible routing direction) of the layer to which the block is to be inserted in some embodiments. In other embodiments, these one or more pins or interconnects may be in a second routing direction that is the non-preferred or impermissible routing direction of the layer to which the block of interest is to be inserted. In some other embodiments, all pins or interconnects in both the preferred or permissible routing direction and the non-preferred or impermissible routing direction.

In addition or in the alternative, these one or more characteristics may include the numbers and/or types (e.g., whether a pin is a power pin, a signal pin, etc.) of internal wires or interconnects that connected the one or more pins or interconnects with each other and/or the sizes (e.g., widths of wires or interconnects) thereof, estimated numbers and/or types of external wires or interconnects that are to connect the one or more pins or interconnects of one block to the destination pins or interconnects of one or more blocks and/or the sizes (e.g., widths) thereof, the number of jogs (if jogs or bends are permitted in the layer into which the block is to be inserted) or vias (if jogs or bends are not permitted in the layer into which the block is to be inserted), the spacing requirements between the block of interest and one or more other blocks, requirements of the routing tracks or one or more track patterns for internal and/or external interconnections involving the one or more pins of a block, or any combinations thereof. For example, a spacing requirement, a requirement of routing tracks or one or more track patterns, an estimated number of jogs or vias may be used to determine or predict the congestion in a space between two adjacent blocks or the complexity in subsequent routing to interconnect the plurality of blocks in the electronic design.

These techniques described herein with reference to FIGS. 3B-3C may determine a total number of pin access points for a block of the plurality of blocks at a candidate location at 306B. A pin access point includes a location in a placement layout or floorplan where a pin or an interconnect on one layer (e.g., M2 layer) crosses a routing track on an adjacent layer (e.g., M3 layer). In some embodiments, the placer may iterate through all the possible candidate locations for a pin of the block within a local region that may be determined based in part or in whole on one or more factors comprising the available computational resources, the importance or criticality of the block being inserted, the functions of the block being inserted, etc. The block (and hence the pin under consideration) may be translated in the floorplan among various candidate locations. At each location, the block (and hence the pin) may also be rotated or even mirrored if permitted by various design rules such as the ones governing the orientation of a block in a particular row.

A routing cost may be estimated for the pin of the block at the candidate location at 308B. In some embodiments, this routing cost may be referred to as a deviation cost and may be determined by the following formula.

Deviation cost of a pin=(Difference in Pin Access Points)/Max Possible No. of Pin Access Points  (1)

Aggregated deviation cost of a block=$\Sigma_{i=1}^{N}$(deviation cost of pin i)  (2)

In Eq. (1), the difference in pin access points may be determined as the difference between the maximum possible number of pin access points of a pin and the current number of pin access points of the pin at a particular candidate location. The maximum possible number of pin access points may be determined by the length of the pin (or interconnect) on one layer and the spacing value(s) of uniform or non-uniform routing tracks on an adjacent layer while considering one or more design rules governing whether the pin (or the block to which the pin belongs) may be placed at the particular candidate location in some embodiments.

In some other embodiments, the maximum possible number of pin access points of a pin may be determined in a similar manner but without considering the one or more design rules. It shall be noted that in aggregating deviation costs of multiple pins, different pins may be associated with the same weight in some embodiments. In these embodiments, an aggregated routing cost may be determined by simply adding individual deviation costs. In some other embodiments, multiple pins may be associated with more than one weight value to distinguish among these multiple pins.

In some embodiments, the placer may iterate through these candidate locations for each pin of a block or for each block to determine respective aggregated routing costs at each of these candidate locations. With these respective aggregated routing costs determined, the placer may then select the final location from these candidate locations at 310B. For example, the candidate location that is associated with the lowest aggregated cost may be selected at 310B as the final location in some embodiments.

In some embodiments, one or more routability rules may also be determined or formulated based in part or in whole upon one or more characteristics; and the estimation or prediction of routability or routing costs may be done by applying these one or more routability rules. A routability rule may be constructed in such a way to assign numerical penalties to the routability or routing costs when the predicate or condition is triggered. For example, the routability may be decreased or the routing cost may be increased if the congestion in the inter-block area exceeds a first threshold and may be further increased if the congestion further exceeds a second, higher threshold.

In some embodiments, the routing tracks in the region may be oriented in the direction that is perpendicular to the orientation of the pins or interconnects identified at 304B in some embodiments. In these embodiments, these routing tracks are identified not to implement wires on the layer to which the block is inserted. Rather, these routing tracks are identified so that a via can be added at a projected intersection between a wire or interconnect on the layer and the neighboring layer, and the routing may continue on the neighboring layer.

In some of these embodiments, the characteristics such as the associated width values of the routing tracks may be optionally identified. Because modern electronic designs often require or prefer wires or interconnects be implemented along tracks or at least some of the manufacturing grids provided by the semiconductor fabrication facilities, the total number of tracks and the optional width values associated therewith may indicate the capacity of the region under consideration to accommodate wires and interconnects. In some embodiments where the block is to be placed in one or more rows, these one or more rows and their associated attributes may also be identified.

In some embodiments, the number or even the locations of the projected intersections between each of the one or more pins or interconnects (or their corresponding routing tracks) and the routing tracks on the neighboring layer(s) may also be determined. As an earlier example illustrated, the number of the projected intersections (projected intersection because the routing tracks belong to two separate layers so they do not actually intersect) may be used as a cost measure to quickly and efficiently determine the routability or routing cost of a candidate location.

During floorplanning or placement of some advanced technology nodes, certain edges of a block may have special orientations, types, and/or spacing requirements. These requirements may be provided in, for example, a technology file which often requires manual lookups and thus cannot be effectively leveraged during the automated, interactive, or assisted floorplanning or placement mode. In some embodiments, one or more edge types of the block and its one or more neighboring blocks may be optionally identified at 320B.

These techniques may optionally annotate pertinent edges or edge segments of the block and its one or more neighboring blocks with the information pertaining to their respective edge types, edge spacing, etc. at 322B. The edge identifiers, edge segment identifiers, opposing edge identifiers, opposing edge segment identifiers, and the annotated information (e.g., spacing values, orientations, etc.) may be stored and indexed in an edge characteristic data structure for subsequent reference or lookup. These annotations optionally determined at 322B may be optionally used to guide the floorplanner or the placement engine at 324B. One or more candidate locations may be determined each block at 326B; and a final location for a block may be selected based in part or in whole upon the routability or routing cost to insert the block into the layer of the electronic design.

Figure 4A:
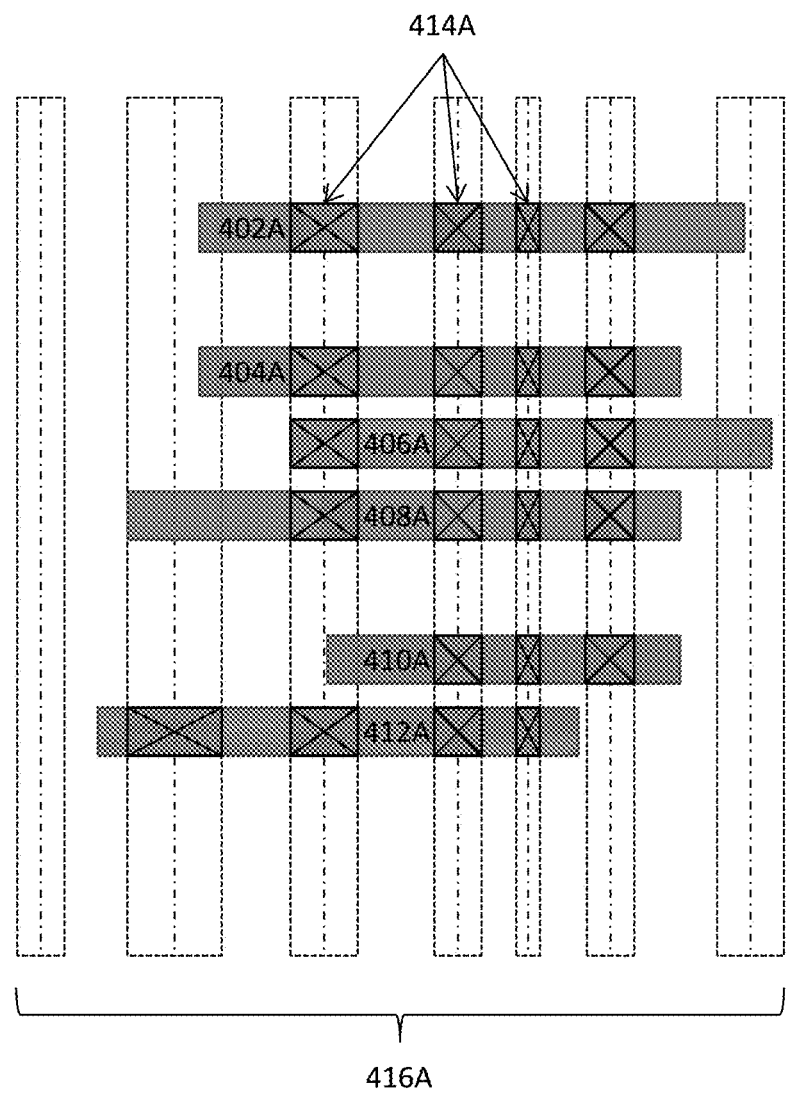
FIGS. 4A-4E illustrate some examples of an application of techniques described herein to an example portion of a simplified electronic design in some embodiments.

FIGS. 4A-4E illustrate some examples of an application of techniques described herein to an example portion of a simplified electronic design in some embodiments. In these examples, FIG. 4A illustrates a plurality of pins or interconnects (402A, 404A, 406A, 408A, 410A, and 412A) on a first layer. FIG. 4A further illustrates a plurality of routing tracks 416A for a second layer immediately neighboring the first layer. The crosses (414A) represent the projected intersections between the pins or interconnects on the first layer and the routing tracks 416A on the second layer.

Figure 4B:
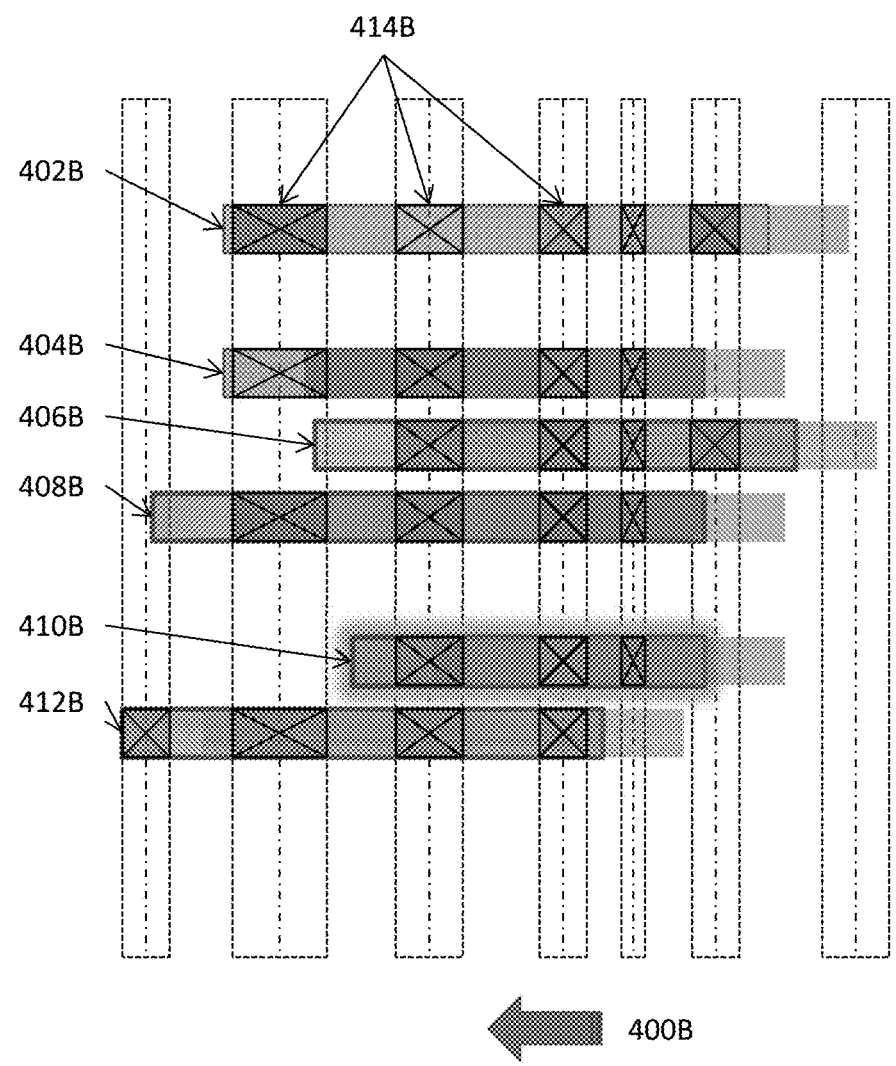

FIG. 4B illustrates a simplified example of selecting and dragging the pins or interconnects (402A, 404A, 406A, 408A, 410A, and 412A) from their original locations illustrated in FIG. 4A on a first layer to a new location to the left as indicated by the arrowhead 400B. These pins or interconnects are represented as (402B, 404B, 406B, 408B, 410B, and 412B) in their respective new locations. As it can be seen from FIG. 4B, there are five projected intersections (only three illustrated as 414B) between the pin or interconnect 402B on the first layer and the routing tracks on the second layer. That is, pin or interconnect now covers five pin access points that can be used as potential via locations. Similarly, there are four (4), four (4), four (4), three (3), and four (4) projected intersections between pins or interconnects 404B, 406B, 408B, 410B, and 412B on the first layer and the routing tracks on the second layer, respectively.

Figure 4C:
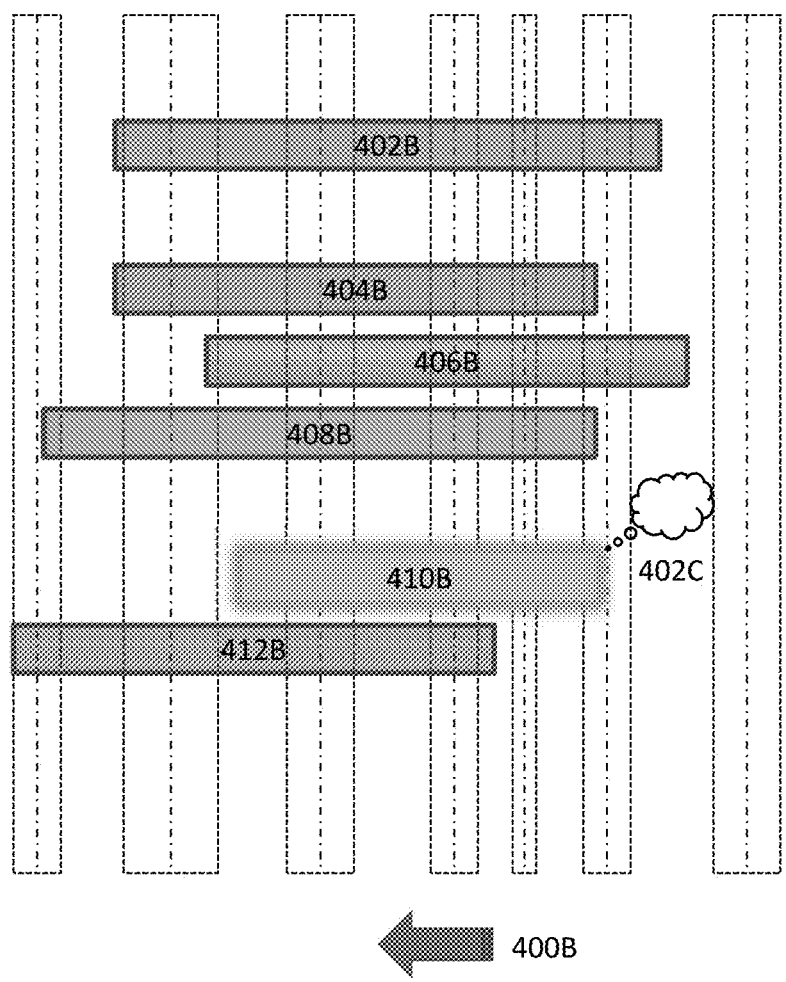

FIG. 4C illustrates an example where the pins or interconnects (402B, 404B, 406B, 408B, 410B, and 412B) have been dragged or inserted at their new locations as illustrated in FIG. 4B. If the minimum pin access points for each pin or interconnect is determined to be three (3), pin or interconnect 410B may be graphically and/or textually emphasized as shown in FIG. 4B. In addition or in the alternative, a balloon 402C may be added to the floorplan or the placement layout to show the information indicating that pin or interconnect 410B violates the minimum pin access point requirement.

Figure 4D:
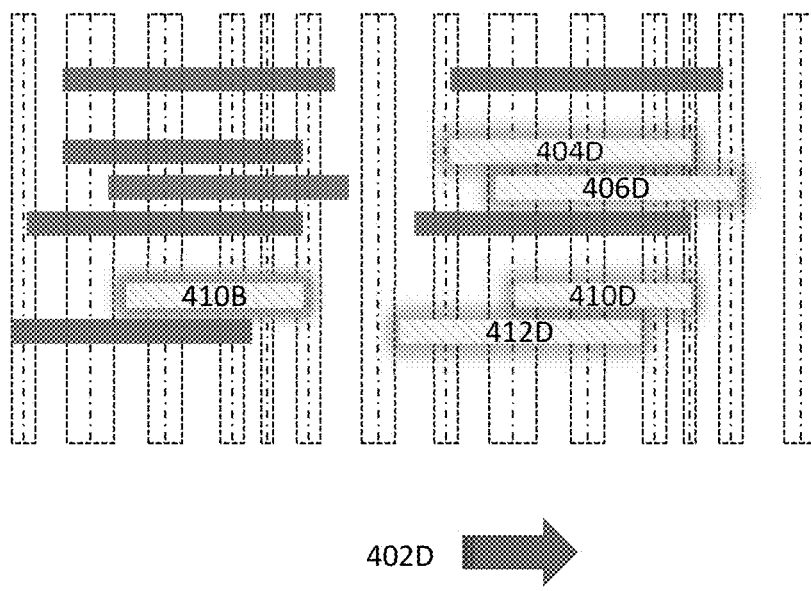

FIG. 4D illustrates another simplified example in an expanded portion of the floorplan or the placement layout. In this example, the pins or interconnects (402B, 404B, 406B, 408B, 410B, and 412B) as illustrated in FIGS. 4B-4C are dragged or moved to a new location to the right as indicated by the arrowhead 402D. If the minimum pin access point remains at three (3), pins or interconnects 404D, 406D, 410D, and 412D are now graphically and/or textually emphasized as shown in FIG. 4D.

Figure 4E:
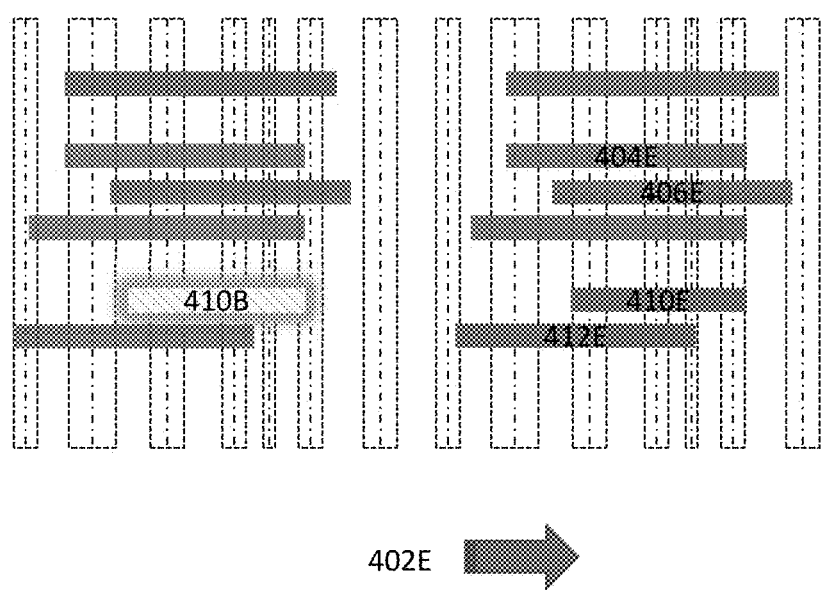
Figure 4E:

FIG. 4E illustrates an automatic fix to the example illustrated in FIG. 4D. For example, a designer may drag or move (or intend to drag or move) the pins or interconnects (402B, 404B, 406B, 408B, 410B, and 412B) as illustrated in FIGS. 4B-4C to their respective new locations as illustrated in FIG. 4D and cause four violations as shown in 404D, 406D, 410D, and 412D. These techniques may search the space around the current location (e.g., the cursor location of the point device) and identifies one or more improved or optimal location for these pins or interconnects. As FIG. 4E shows, pins or interconnects 404E, 406E, 410E, and 412E illustrated in FIG. 4E are no longer in violation (no graphical or textual emphasis).

Figure 5A:
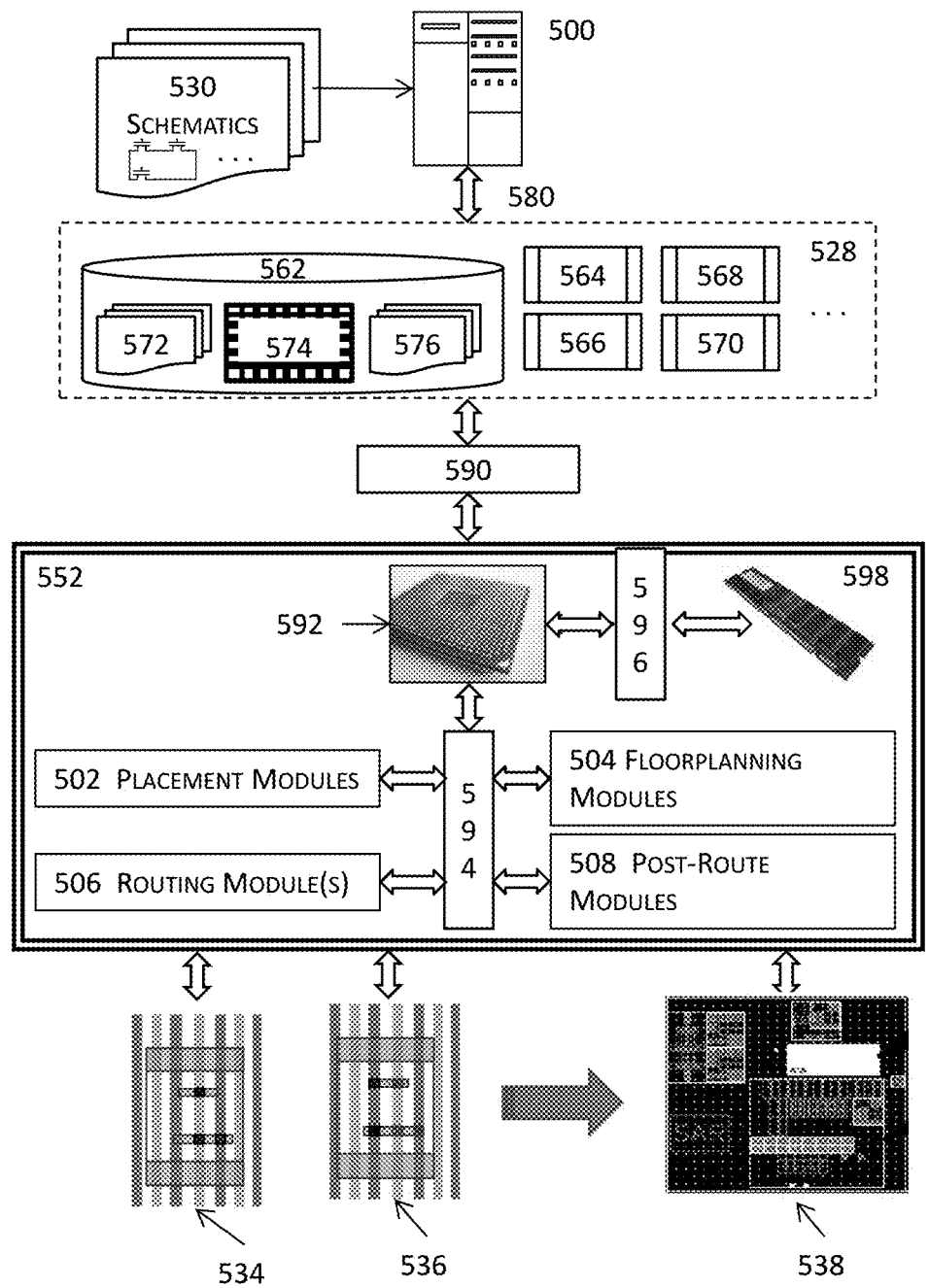
FIG. 5A illustrates a block diagram of a system for implementing routing aware placement for an electronic design in one or more embodiments.

FIG. 5A illustrates a block diagram of a system for implementing routing aware placement for an electronic design in one or more embodiments. More specifically, FIG. 5A illustrates an illustrative high level schematic block diagrams for a system for implementing routing aware placement for an electronic design and may comprise one or more computing systems 500, such as a general purpose computer described in the System Architecture Overview section configured to perform unique functions described herein to achieve one or more special, intended proposes.

The illustrative system in FIG. 5A may include an Internet-based computing platform providing a shared pool of configurable computer processing resources (e.g., computer networks, servers, storage, applications, services, etc.) and data to other computers and devices in an ubiquitous, on-demand basis via the Internet. For example, one or more computing resources and/or modules illustrated in FIG. 5A may be located in a cloud computing platform in some embodiments.

The one or more computing systems 500 receive the schematics 530 of an electronic design and invoke various modules (e.g., an automatic floorplanner, an interactive placement module, etc.) to generate a floorplan or a placement layout (e.g., 534 and 536) that may be further processed by a routing engine to generate a routed layout 538. This routed layout 538 may also be optionally processed with various post-route modules to generate a fabrication worthy layout from which a set of mask designs can also be generated to ready the electronic design for tapeout.

In some embodiments, the one or more computing systems 500 may invoke various system resources such as the processor(s) or processor core(s), memory, disks, etc. The one or more computing systems 500 may also initiate or interact with other computing systems to access, via a computer bus architecture (e.g., a system bus, a control bus, a data bus, or any combinations thereof), various resources 528 that may comprise a floorplanner, a global routing engine, and/or a detail routing engine 564, a layout editor 566, a design rule checker 568, a verification engine 570, etc.

The one or more computing systems 500 may further write to and read from a local or remote non-transitory computer accessible storage 562 that stores thereupon data or information such as, but not limited to, one or more databases (574) such as schematic design database(s) or physical design database(s), electronic circuit design specification database(s), various statistics, various data, rule decks, various design rules, constraints, etc. (572), or other information or data (576) that may be used to facilitate the performance of various functions to achieve the intended purposes.

In some embodiments, the one or more computing systems 500 may include or, either directly or indirectly through the various resources 528, invoke a set of modules 552 including hardware modules and software modules or combinations of one or more hardware modules and one or more software modules that may comprise placement modules 502 (e.g., interactive placement module, assisted placement module, automatic placement module, etc.) that are made aware of various routing requirements, design rules, constraints, etc. and interact with a designer in implementing a placement layout.

For example, a designer may manually define a region and manually drag an instance to a desired location in the manually defined region in a placement layout or floorplan, and an interactive placement module 502 may determine one or more legal positions in one or more rows in a row region based on where the design drags the instance in order to insert the instance to create a legal placement layout or floorplan using the techniques described herein.

The set of modules 552 may also include floorplanning modules 504 that assist a designer in placing one or more blocks, cells, macros, and/or instances in a floorplan. For example, a designer may specify a set of blocks to be placed in a region in a floorplan. An assisted floorplanning module 504 may identify this set of blocks and their respective characteristics, identify one or more row templates, track patterns, and/or requirements, apply the one or more row templates or track patterns to the region, and determine one or more viable floorplanning options for the set blocks.

The set of modules 552 may also include a routing module 506 that receives the floorplan from a floorplanner 504 or a placement layout from a placement module 502 and performs routing (e.g., global routing, channel routing, conduit routing, detailed routing, etc.) to interconnect devices in the received floorplan or placement layout. The set of modules 552 may also include post-route modules 508 to perform various post-route operations. These post-route modules 508 may include, for example, one or more verification modules to perform various behavior, functional, and/or formal verification tasks, one or more post-route optimization modules to perform various optimization tasks on the routed layout, and/or one or more signoff modules (not shown) to perform various signoff and design closure tasks.

For example, the one or more signoff modules may include one or more timing signoff modules to perform timing analyses and timing closure related tasks (e.g., silicon-accurate timing signoff, signal integrity analyses, etc.)

to ensure an electronic design meets power, performance, or other requirements before tapeout, one or more signoff parasitic extraction modules to provide silicon-accurate interconnect parasitic extraction and ensure first-pass silicon success, and one or more power signoff modules to perform various power integrity analyses, transistor-level electromigration and IR-drop analyses, or other power and signal integrity analyses with SPICE-level or better accuracy to ensure an electronic design meets or exceeds power, performance, and/or area goals in some embodiments.

In some embodiments, the computing system 500 may include the various resources 528 such that these various resources may be invoked from within the computing system via a computer bus 580 (e.g., a data bus interfacing a microprocessor 592 and the non-transitory computer accessible storage medium 598 or a system bus 590 between a microprocessor 592 and one or more engines in the various resources 528). In some other embodiments, some or all of these various resources may be located remotely from the computing system 500 such that the computing system may access the some or all of these resources via a computer bus 580 and one or more network components.

The computing system may also include one or more modules in the set of modules 552. One or more modules in the set 552 may include or at least function in tandem with a microprocessor 592 via a computer bus 594 in some embodiments. In these embodiments, a single microprocessor 592 may be included in and thus shared among more than one module even when the computing system 500 includes only one microprocessor 592. A microprocessor 592 may further access some non-transitory memory 598 (e.g., random access memory or RAM) via a system bus 596 to read and/or write data during the microprocessor's execution of processes.

System Architecture Overview

Figure 5B:
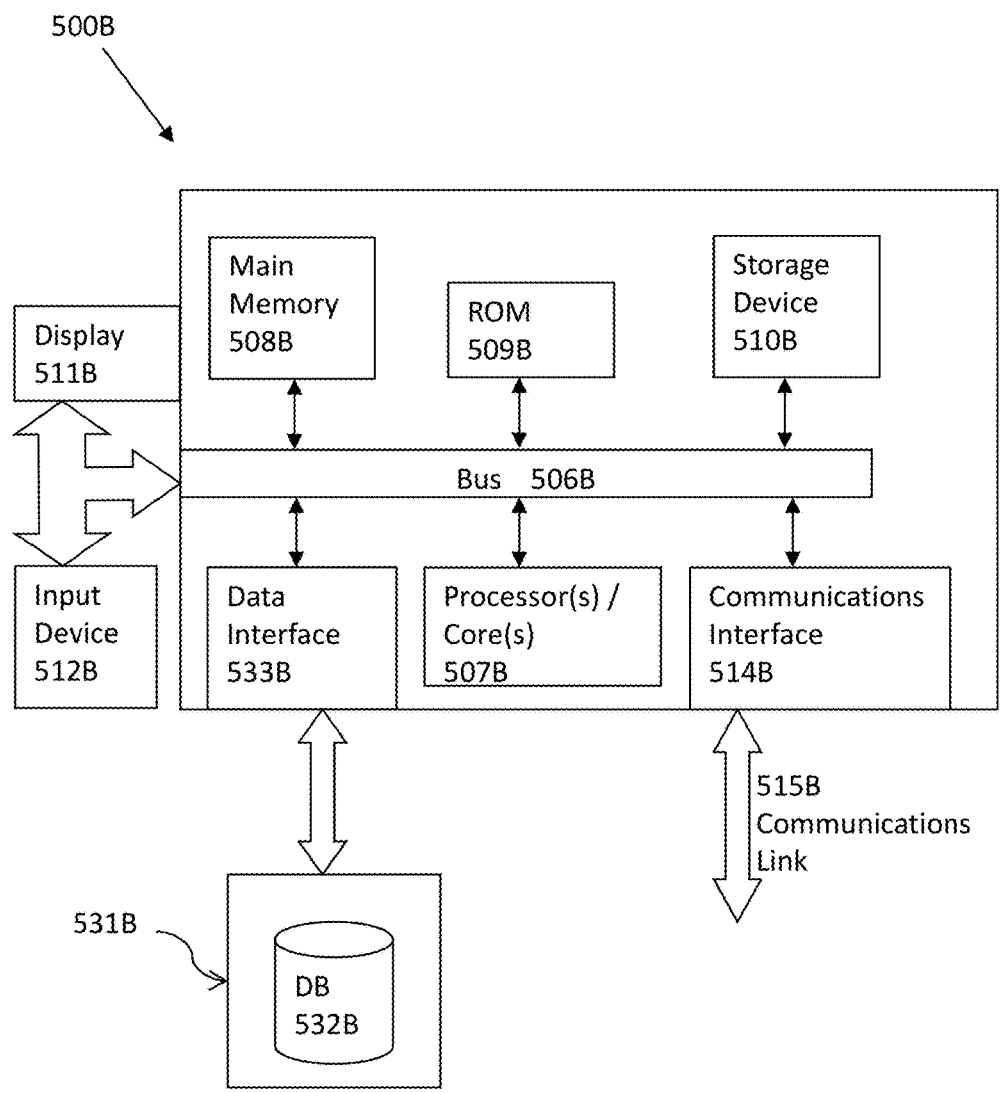
FIG. 5B illustrates a computerized system on which a method for implementing routing aware placement for an electronic design may be implemented.

FIG. 5B illustrates a computerized system on which a method for implementing placement using row templates for an electronic design using row templates may be implemented. as described in the preceding paragraphs with reference to various figures. The illustrative computing system 500B may include an Internet-based computing platform providing a shared pool of configurable computer processing resources (e.g., computer networks, servers, storage, applications, services, etc.) and data to other computers and devices in a ubiquitous, on-demand basis via the Internet. For example, the computing system 500B may include or may be a part of a cloud computing platform in some embodiments. Computer system 500B includes a bus 506B or other communication module for communicating information, which interconnects subsystems and devices, such as processor 507B, system memory 508B (e.g., RAM), static storage device 509B (e.g., ROM), disk drive 510B (e.g., magnetic or optical), communication interface 514B (e.g., modem or Ethernet card), display 511B (e.g., CRT or LCD), input device 512B (e.g., keyboard), and cursor control (not shown).

According to one embodiment, computing system 500B performs specific operations by one or more processor or processor cores 507B executing one or more sequences of one or more instructions contained in system memory 508B. Such instructions may be read into system memory 508B from another computer readable/usable storage medium, such as static storage device 509B or disk drive 5108. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 507B, where the one or more processors, one or more processor cores, or combination thereof executes one or more threads. For example, various acts of identifying, various acts of determining, various acts of classifying, various acts of implementing, various acts of performing, various acts of transforming, various acts of decomposing, various acts of updating, various acts of presenting, various acts of modifying, etc. may be performed by one or more processors, one or more processor cores, or combination thereof.

A modules described herein may also be implemented as a pure hardware module (e.g., a block of electronic circuit components, electrical circuitry, etc.) or a combination of a hardware module and a software block that jointly perform various tasks to achieve various functions or purposes described herein or equivalents thereof. For example, a module described herein may be implemented as an application-specific integrated circuit (ASIC) in some embodiments.

In these embodiments, a module may thus include, for example, a microprocessor or a processor core and other supportive electrical circuitry to perform specific functions which may be coded as software or hard coded as a part of an application-specific integrated circuit, ROM (read only memory), PROM (programmable read only memory), EPROM (erasable programmable read only memory), etc. despite the fact that these microprocessor, processor core, and electrical circuitry may nevertheless be shared among a plurality of module. A module described herein or an equivalent thereof may perform its respective functions alone or in conjunction with one or more other modules. A module described herein or an equivalent thereof may thus invoke one or more other modules by, for example, issuing one or more commands or function calls. The invocation of one or more other modules may be fully automated or may involve one or more user inputs.

The term "computer readable storage medium" or "computer usable storage medium" as used herein refers to any non-transitory medium that participates in providing instructions to processor 507B for execution. Such a medium may take many forms, including but not limited to, non-volatile media and volatile media. Non-volatile media includes, for example, optical or magnetic disks, such as disk drive 510B. Volatile media includes dynamic memory, such as system memory 508B. Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 500B. According to other embodiments of the invention, two or more computer systems 500B coupled by communication link 515B (e.g., LAN, PTSN, or wireless network) may perform the sequence of instructions required to practice the invention in coordination with one another.

Computer system 500B may transmit and receive messages, data, and instructions, including program, i.e., application code, through communication link 515B and communication interface 514B. Received program code may be executed by processor 507B as it is received, and/or stored in disk drive 510B, or other non-volatile storage for later execution. In an embodiment, the computing system 500B operates in conjunction with a data storage system 531B, e.g., a data storage system 531B that includes a database 532B that is readily accessible by the computing system 500B. The computing system 500B communicates with the data storage system 531B through a data interface 533B. A data interface 533B, which is coupled with the bus 506B, transmits and receives electrical, electromagnetic or optical signals that include data streams representing various types of signal information, e.g., instructions, messages and data. In embodiments of the invention, the functions of the data interface 533B may be performed by the communication interface 514B.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. A computer implemented method for implementing routing aware placement for an electronic design, comprising:
    identifying a block including one or more first pins or interconnects to be inserted into a first layer that corresponds to a first set of routing tracks and one or more requirements of the first set of routing tracks;
    identifying a second set of routing tracks on a second layer that is adjacent to the first layer in a stack of layers of a floorplan or a placement layout of an electronic design;
    generating, at a floorplanning module or a placement module programmed to function in tandem with at least one microprocessor of a computing system, one or more candidate locations on the first layer for the block at least by filtering a plurality of candidate locations based in part or in whole upon the first set of routing tracks, wherein
        the first set of routing tracks are along a first routing direction, and
        the second set of routing tracks are along a second routing direction that is different from the first routing direction; and
    inserting the block into a location of the one or more candidate locations on the first layer based in part or in whole upon respective costs or routability of the one or more candidate locations with respect to the second set of routing tracks.

2. The computer implemented method of claim 1, wherein the one or more candidate locations are generated at least by filtering at least one candidate location from the plurality of candidate locations based in part or in whole upon the first set of routing tracks associated with the first layer.

3. The computer implemented method of claim 2, further comprising:
    identifying a current location of the block on the first layer in a floorplan or a placement layout of the electronic design.

4. The computer implemented method of claim 2, further comprising:
    identifying one or more neighboring layers including the second layer of the electronic design;
    identifying the second set of routing tracks along the second routing direction; and
    identifying the one or more first pins or interconnects for the block and one or more requirements of the first set of routing tracks in the first routing direction.

5. The computer implemented method of claim 4, further comprising:
    determining the respective costs or routability for the one or more candidate locations based in part or in whole upon one or more characteristics of the second set of routing tracks; and
    determining a final candidate location from the one or more candidate locations based in part or in whole upon the respective costs or routability.

6. The computer implemented method of claim 5, determining the final candidate location comprising:
    identifying a plurality of blocks including the block; and
    identifying the one or more first pins or interconnects and one or more characteristics for the block.

7. The computer implemented method of claim 6, wherein the one or more characteristics include at least one of a geometric characteristic of a pin or interconnect, a position of the pin or interconnect in the block, a number of internal wires or interconnects connecting at least some of the one or more first pins or interconnects, one or more types of the internal wires or interconnects connecting the at least some of the one or more first pins or interconnects, one or more sizes of the internal wires or interconnects connecting the at least some of the one or more first pins or interconnects, an estimated number of external wires or interconnects that are to connect at least one of the one or more first pins to at least one different pin or interconnect of a different block, one or more types of external wires or interconnects that are to connect at least one of the one or more first pins to at least one different pin or interconnect of a different block, an estimated number of jogs or vias for the external wires or interconnects, one or more track pattern requirements of the first set or the second set of routing tracks, or one or more combinations thereof.

8. The computer implemented method of claim 6, determining the final candidate location comprising:
    associating the plurality of blocks with respective pin access deviation costs.

9. The computer implemented method of claim 8, determining the final candidate location comprising:
    identifying a first candidate location from the one or more candidate locations for the block;
    identifying the one or more first pins or interconnects of the block; and
    identifying one or more pin or interconnect locations for each of the one or more first pins or interconnects.

10. The computer implemented method of claim 9, further comprising:
determining a respective pin access deviation cost for each pin or interconnect location of the one or more pin or interconnect locations for the each pin or interconnect.

11. The computer implemented method of claim 10, further comprising:
determining an aggregate routing cost for the block based in part or in whole upon the respective pin access deviation cost.

12. The computer implemented method of claim 10, further comprising:
identifying a maximum possible number of pin access points for the each pin or interconnect based in part or in whole upon one or more characteristics of the each pin or interconnect and one or more track characteristics of routing tracks; and
determining the respective pin access deviation cost based in part or in whole upon the maximum possible number of pin access points.

13. A system for implementing routing aware placement for an electronic design, comprising:
a plurality of modules, at least one of which comprises at least one microprocessor including one or more processor cores executing one or more threads in a computing system;
a non-transitory computer accessible storage medium storing thereupon program code that includes a sequence of instructions that, when executed by the plurality of modules, causes the plurality of modules at least to:
identify a block including one or more first pins or interconnects to be inserted into a first layer that corresponds to a first set of routing tracks and one or more requirements of the first set of routing tracks;
identify a second set of routing tracks on a second layer that is adjacent to the first layer in a stack of layers of a floorplan or a placement layout of an electronic design;
generate one or more candidate locations on the first layer for the block at least by filtering a plurality of candidate locations based in part or in whole upon the first set of routing tracks, wherein
the first set of routing tracks are along a first routing direction, and
the second set of routing tracks are along a second routing direction that is different from the first routing direction; and
insert the block into a location of the one or more candidate locations on the first layer based in part or in whole upon respective costs or routability of the one or more candidate locations with respect to the second set of routing tracks.

14. The system of claim 13, wherein the one or more candidate locations are generated at least by filtering at least one candidate location from the plurality of candidate locations based in part or in whole upon the first set of tracks associated with the first layer.

15. The system of claim 14, wherein the program code includes further instructions that, when executed by the plurality of modules, cause the plurality of modules to:
identify one or more neighboring layers including the second layer of the electronic design;
identify the second set of routing tracks along second routing direction;
identify the one or more first pins or interconnects for the block and one or more requirements of the first set of tracks in the first routing direction;
determine the respective costs or routability for the one or more candidate locations based in part or in whole upon one or more characteristics of the second set of routing tracks;
determine a final candidate location from the one or more candidate locations based in part or in whole upon the respective costs or routability;
identify a plurality of blocks including the block; and
identify the one or more first pins or interconnects and one or more characteristics for the block.

16. The system of claim 15, wherein the program code includes further instructions that, when executed by the plurality of modules, cause the plurality of modules to:
identify a first candidate location from the one or more candidate locations for the block;
identify the one or more first pins or interconnects of the block;
identify one or more pin or interconnect locations for each of the one or more first pins or interconnects;
identify a maximum possible number of pin access points for the each pin or interconnect based in part or in whole upon one or more characteristics of the each pin or interconnect and one or more track characteristics of routing tracks;
determine a respective pin access deviation cost for each pin or interconnect location of the one or more pin or interconnect locations for the each pin or interconnect based in part or in whole upon the maximum possible number of pin access points; and
determine an aggregate routing cost for the block based in part or in whole upon the respective pin access deviation cost.

17. An article of manufacture comprising a non-transitory computer accessible storage medium having stored thereupon a sequence of instructions which, when executed by at least one processor or at least one processor core executing one or more threads, causes the at least one processor or the at least one processor core to perform a set of acts for implementing routing aware placement for an electronic design, the set of acts comprising:
identifying a block including one or more first pins or interconnects to be inserted into a first layer that corresponds to a first set of tracks and one or more requirements of the first set of routing tracks;
identifying a second set of routing tracks on a second layer that is adjacent to the first layer in a stack of layers of a floorplan or a placement layout of an electronic design;
generating, at a floorplanning module or a placement module programmed to function in tandem with at least one microprocessor of a computing system, one or more candidate locations on the first layer for the block at least by filtering a plurality of candidate locations based in part or in whole upon the first set of routing tracks wherein
the first set of routing tracks are along a first routing direction, and
the second set of routing tracks are along a second routing direction that is different from the first routing direction; and
inserting the block into a location of the one or more candidate locations on the first layer based in part or in whole upon respective costs or routability of the one or more candidate locations with respect to the second set of routing tracks.

18. The article of manufacture of claim 17, wherein the one or more candidate locations are generated at least by filtering at least one candidate location from the plurality of candidate locations based in part or in whole upon the first set of tracks associated with the first layer.

19. The article of manufacture of claim 18, the set of acts further comprising:
    identifying one or more neighboring layers including the second layer of the electronic design;
    identifying the second set of routing tracks along the second routing direction;
    identifying the one or more first pins or interconnects for the block and one or more requirements of the first set of tracks in the first routing direction;
    determining the respective costs or routability for the one or more candidate locations based in part or in whole upon one or more characteristics of the second set of routing tracks;
    determining a final candidate location from the one or more candidate locations based in part or in whole upon the respective costs or routability;
    identifying a plurality of blocks including the block; and
    identifying the one or more first pins or interconnects and one or more characteristics for the block.

20. The article of manufacture of claim 19, the set of acts further comprising:
    identifying the one or more first pins or interconnects of the block and one or more second pins or interconnects of the one or more neighboring blocks; and
    associating the plurality of blocks with the respective pin access deviation costs or routability.

\* \* \* \* \*